Feb. 28, 1967   P. JEAN-BAPTISTE ASTIER ETAL   3,307,018
CARD CONTROL APPARATUS
Filed July 31, 1962   5 Sheets-Sheet 1

Inventors:
Pierre Jean-Baptiste Astier
Jean Gilbert Claude Mincel
By Karl W. Flocks
Attorney

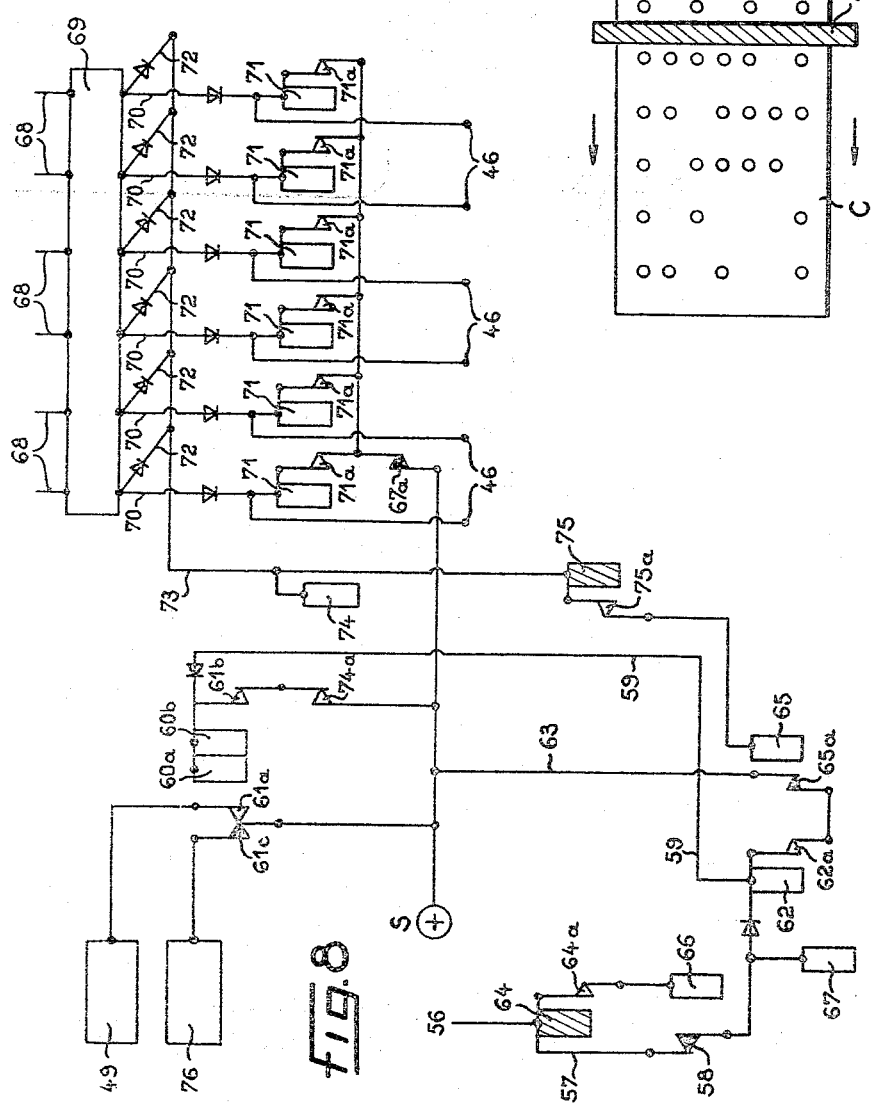

United States Patent Office 3,307,018
Patented Feb. 28, 1967

3,307,018
CARD CONTROL APPARATUS
Pierre Jean-Baptiste Astier, 4 Rue Eugene Jumin, and Jean Gilbert Claude Mincel, 7 Rue Leon Vaudoyer, both of Paris, France
Filed July 31, 1962, Ser. No. 213,776
Claims priority, application France, Aug. 11, 1961, 870,738
5 Claims. (Cl. 235—61.6)

The present invention relates to the feeding and reading of perforated cards for typesetting machines of the Linotype kind.

It is known to control a typesetting machine by means of perforated tapes, but as far as the applicants are aware, it is not known to operate a typesetting machine directly from perforated cards following a predetermined code.

The present invention provides a unit which is readily capable of effecting this control.

In the most general way, the invention provides a unit consisting of:
A feeding device for the perforated cards,
A station for reading the perforations,
A station for receiving the cards after reading,
An electric circuit transmitting signals corresponding to the coded perforations to a mechanical device for reproducing coded signs mounted on the typesetting machine and cooperating with the reading device which exists already on this machine, the said existing reading device being normally only capable of use with perforated tapes.

In a more particular manner:
The feed device for perforated cards comprises a card magazine, an oscillating arm provided with gripping means, and means for conveying each card to the perforation-reading station:

The perforation-reading station is advantageously a station with photosensitive cells transforming the light signals to electric signals and transmitting them to the electromechanical device mounted on the machine and cooperating with the existing reading device on this latter machine;

The electromechanical device mounted on the reading dtvice existing on a typesetting machine is advantageously of the type which presents in front of the feelers of the said existing reading device, the mechanical equivalent of the combination of the perforations appearing on the perforated card, without the said card being read by the said existing reading device, which is furthermore not designed for such a reading function.

More specifically, the said gripping means is constituted by suction devices operating on the cards by suction;

The means for conveying each card to the perforation-reading station comprises a series of rotating pressure rollers;

The reading station provides a forward movement of the cards at a predetermined speed to the point of the photosensitive cells, by virtue of a suitable driving system of pressure rollers.

Other advantages and characteristic features of the invention will be brought out more clearly from the description which follows below, reference being made to the accompanying drawings, in which:

FIG. 8 is a view of the electrical diagram enabling the advance of the perforated card to be made at a predetermined speed for the purpose of reading; and FIG. 9 is a diagrammatic view showing a card above the reading device.

Figure 1:
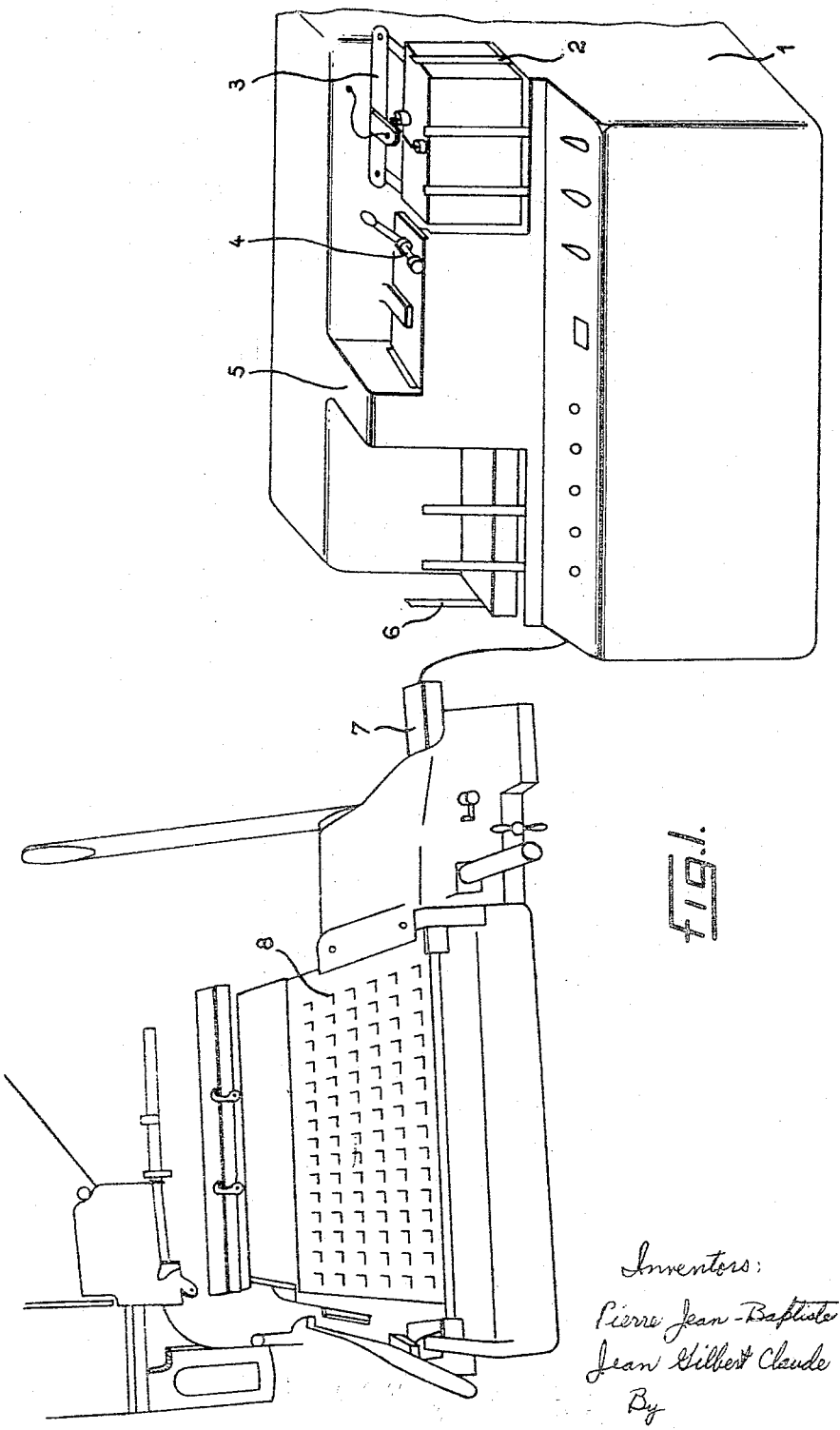
FIG. 1 is a general perspective and diagrammatic view of the equipment provided for the control of a typesetting machine by perforated cards, according to the invention.

Referring to these drawings, there has been shown in FIG. 1 and designated by the reference 1, a casing comprising the whole unit according to the invention, that is to say, a card magazine having the general reference 2, the card gripping device indicated as a whole by the general reference 3 which leads the cards to the reading station 5, through the intermediary of a conveying means for each card, designated as a whole by the general reference 4; there can be seen at 6 the collecting station for the read cards and at 7 the device for reproducing perforations above the already existing feelers of a typesetting machine 8.

Figure 2:
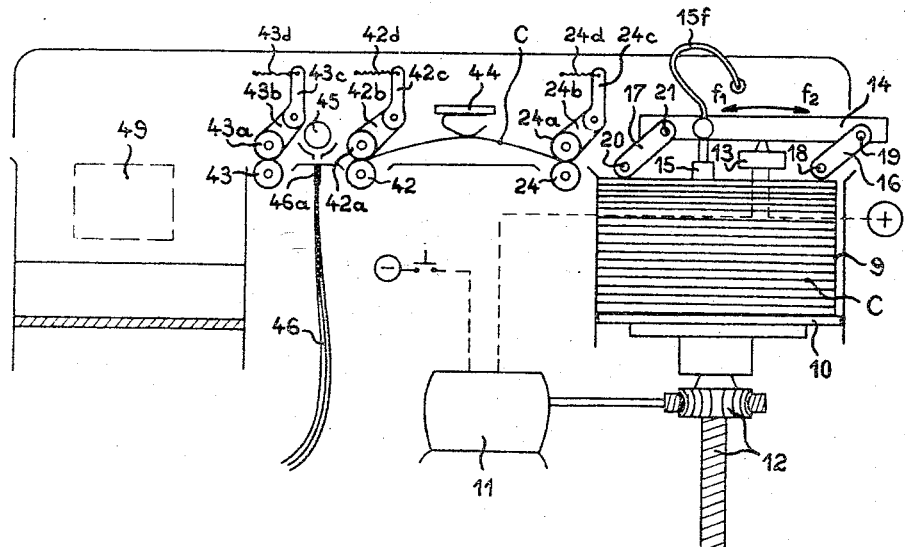
FIG. 2 is a more detailed explanatory view of the whole of the apparatus for feeding and reading perforated cards.
Figure 3:
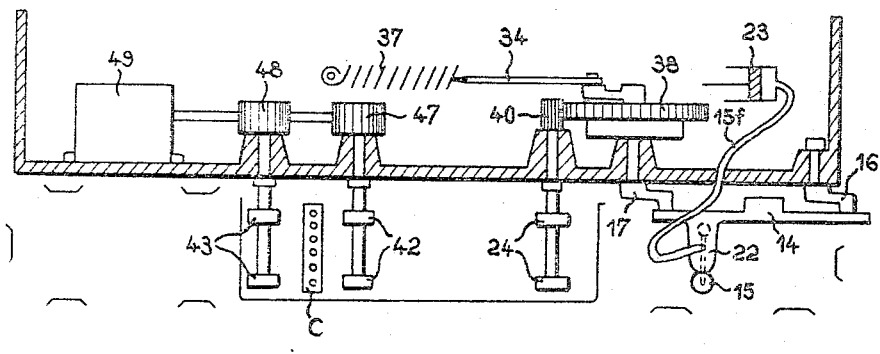
FIG. 3 is a plan view corresponding to FIG. 2.
Figure 7:
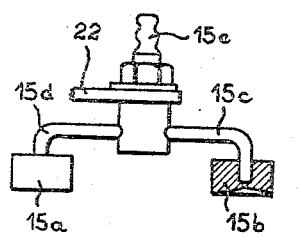
FIG. 7 is a detailed and diagrammatic view of the parts of the gripping device.

More particularly, the units 2 and 3 comprise a casing 9 (FIG. 2) with a movable bottom 10. This bottom, which can be raised or lowered, is connected to a motor 11 driving the pinion and endless screw 12. The motor 11 is preferably an electric motor and its starting-up or stopping is controlled by a switch 13. This switch 13 can be actuated either by manually operated buttons or by the gripping and feed device 3 itself. In fact, this unit, known as the distributor unit, is constituted by an arm 14 which carries gripping means 15. This arm 14 forms one of the large sides of an articulated parallelogram, the two smaller sides of which are formed by crank arms 16 and 17 which are articulated in turn respectively at 18 and 19 and at 20 and 21. By virtue of this arrangement, the arm 14 can thus oscillate in the directions of the arrows $f1$, $f2$. It carries the gripping means 15 by means of a bracket 22 (FIG. 3); as can be seen from FIG. 7, these gripping means comprise two suction devices 15a and 15b, coupled by tubes and conduits 15c, 15d, 15e and 15f with a lift-and-force pump 23.

This first unit is immediately followed by two first rollers known as feed rollers designated by the references 24 and 24a. These rollers, together with the others which may be indicated during the course of the present description are pressure rollers when their reference numbers are followed by the index a. They are in fact mounted on crank-arms having the same references but followed by the indices b and c. Thus, the roller 24a corresponds to the crank-arms 24b and 24c. A spring 24d acting on 24c operates in such manner that the roller 24a always applies pressure to the roller 24.

Figure 4:
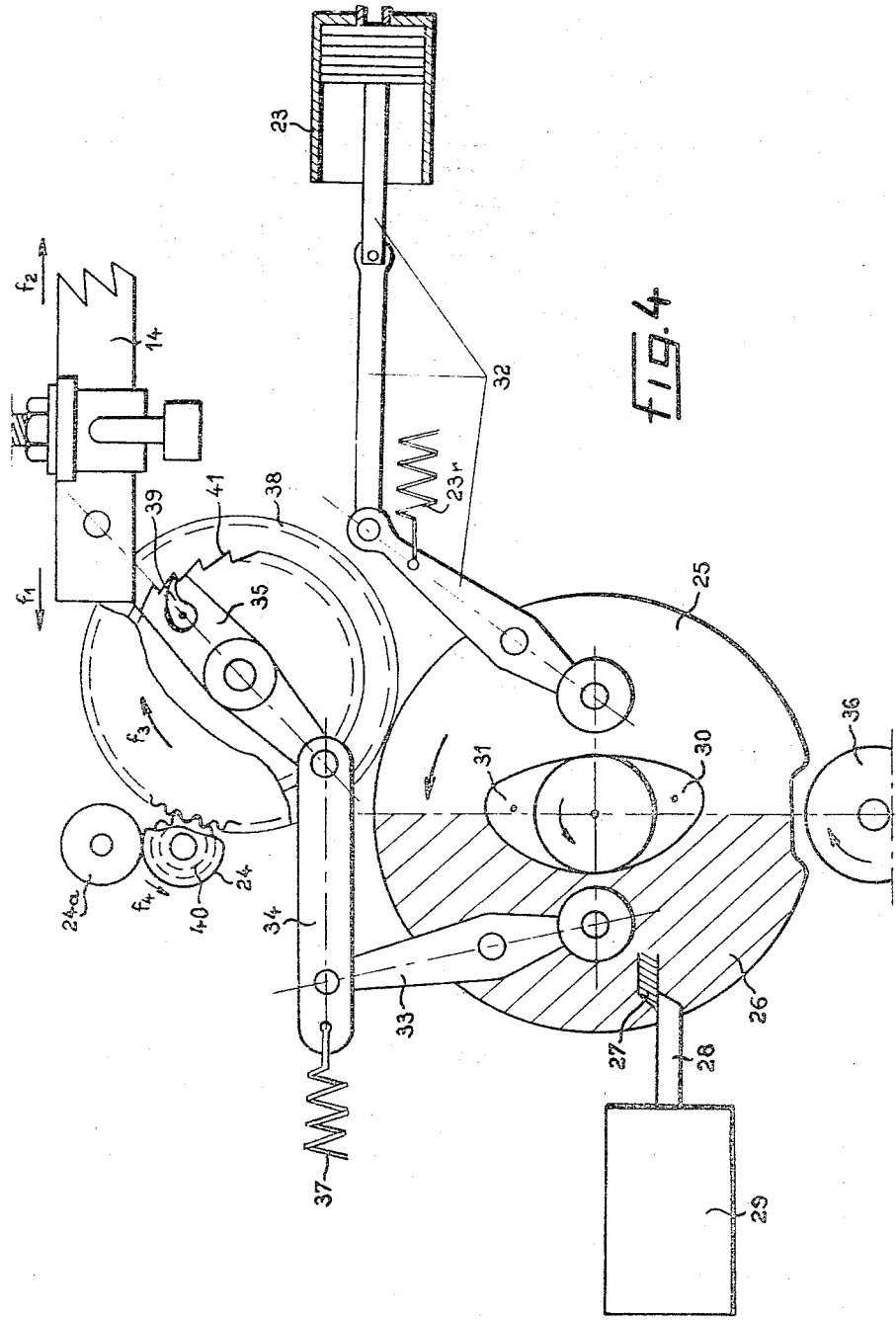
FIG. 4 is a view on a larger scale of the mechanical details for the operation of the device for manipulating and feeding the cards.

There will now be described the mechanical means according to the invention to permit the control of the arm 14, the manipulation of a card and its admission between the rollers 24 and 24a. The description of these means will be given with reference to FIG. 4. A wheel 25 is weighted at 26. It comprises a stop 27 known as a retaining stop, cooperating with the plunger 28 of an electromagnet 29. On this wheel are mounted cams 30 and 31, one of which 30, is intended to act on a rod-crank assembly 32 acting on the pump 23, while the other, 31, acts by an assembly of rods designated by the references 33, 34 and 35, on the arm 14.

When an electric order energizes the electromagnet 29, the plunger 28 frees the retaining stop 27 of the wheel 25. As the latter is freely mounted on its shaft, it is applied by means of the weighted portion 26 in frictional and rotation engagement with the roller 36 which is rotated at a constant speed by any appropriate means.

The rotation of the wheel 25 first causes action on the pump 23 through the cam 30, and suction by the suction devices 15a and 15b of a perforated card C. Then, with a very short time displacement, the cam 31 acts on the assembly 33, 34 and 35, so as to cause oscillation of the arm 14 in the direction of the arrow f1, in order to introduce a card between the rollers 24 and 24a.

When the cams 30 and 31 have completed their cycle, the arm 14 is brought back to its initial position in the direction of the arrow f2 by virtue of the articulated unit 33, 34 and 35 and the return spring 37.

With regard to the pump 23, this acts as a force-pump by virtue of its return spring 23r, and the card C is released by the gripping device.

It should be observed that the roller 24 is rigidly fixed to a toothed wheel 40 meshing with a toothed wheel 38. The rod 35 comprises a ratchet 39 intended to come into engagement with the toothed portion of a crown 41 of the wheel 38. When the arm 14 is displaced in the direction of f1, the ratchet 39 escapes from each of the teeth of the ring 41. On the other hand, when the arm 14 is moved in the direction of f2, the ratchet is in engagement with a tooth of the crown 41 and acts so as to rotate the wheel 38 in the direction of the arrow f3, which causes the roller 24 to rotate in the direction of the arrow f4. This results in a rapid displacement of the card previously introduced between the rollers 24 and 24a, rotating freely when the arm 14 carries out its movement in the direction of f1.

It will be understood that when the wheel 25 has made a complete turn, the retaining stop 27 comes up against 28, the electromagnet 29 is de-energized and the unit is then ready to carry out a new cycle.

It should also be noted that if, during its return travel, the arm 14 moves too far downwards with its gripping means 15 as a result of a lack of cards in the magazine 9, it acts on the contactor 13 and causes the starting-up of the motor 11 and the upward movement of the plate 10 to the desired height, through the intermediary of the unit 12.

It has just been indicated that it is possible to act on the velocity of rotation of the roller 24. It will be shown below that the rollers 42 and 43 belonging to the advance system of the card cooperating with the card-reading device, are given an appropriate velocity of rotation. This velocity is advantageously less, however, than that which is obtained when the roller 24 is driven through the intermediary of the toothed wheel 38. It thus follows that a card such as C, held by a spring system takes on a hump-backed shape between the rollers 24 and 24a and the rollers 42 and 42a. The rollers 42a and 43a are mounted in the same way as the roller 24a. The description of this arrangement will therefore not be repeated here.

The unit comprising the rollers 42, 43, 42a and 43a serves to cause the card to move above the photoelectric cell reading device. This device is shown diagrammatically in FIG. 2 by a source of light 45 and the output cables 46 for an electric signal emitted by photoelectric cells (of which one is shown diagrammatically at 46a).

Figure 5:
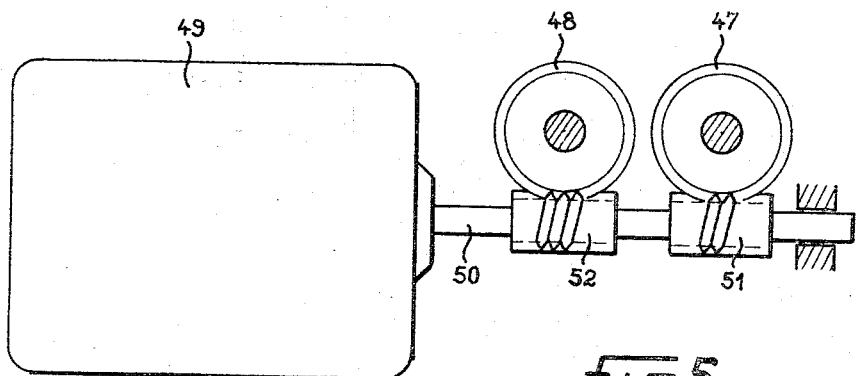
FIG. 5 is a view of a detail permitting the uniform advance of the perforated cards over the reading device.

The rollers 42 and 43 are mounted coaxially with pinions 47 and 48. The drive of these pinions is shown in greater detail in FIG. 5, in which there has been shown the motor 49, the shaft 50 of which carries endless screws 51 and 52, each in engagement with the pinions 47 and 48.

The drive of the rollers 42 and 43 so as to cause the card C to travel in a suitable manner in front of the reading system, is ensured by means of the electrical unit shown in FIG. 8, in order to synchronize the reading of the perforated cards with the operation of a typesetting machine.

The signals emitted by 46 are sent into the device 7 which is intended to reproduce at the level of the already existing feelers of a standard reading system for a typesetting machine adapted for automatic control by perforated tapes. This device 7 may advantageously be of the kind described in the French patent application filed by the present applicants on July 27, 1961 having for its title "Dispositif de reproduction de signes codifiés sur bandes applicable aux machines à composer."

When the reading has been completed, the cards such as C leave the rollers 43 and fall one after the other into the storage magazine 6.

Figure 6:
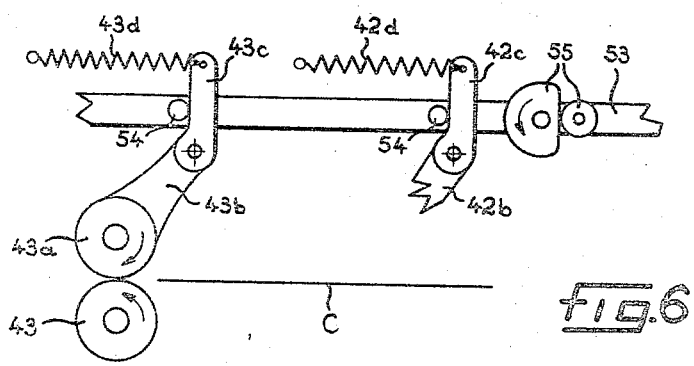
FIG. 6 is a view to a larger scale of a detail of FIG. 2 relating to the feed pressure rollers.

Incidentally, it should be observed that in order to facilitate the manipulation of the cards between the rollers, there may be provided a manual control unit such as that shown in FIG. 6. It has been indicated above that the pressure of the upper rollers, such as 24a, 42a and 43a was ensured by means of springs having the same reference numbers with the index d. The action of these springs can be opposed manually through the intermediary of a rod such as 53, provided with studs such as 54 acting on the rods such as 42c and 43c by means of a cam and roller system 55.

With regard to the control of the velocities of rotation and advance of the card in front of the reading system, reference will now be made to FIGS. 8 and 9.

It should be noted at this point that the reading of a combination of perforations cannot of course begin unless the composing stick of the typesetting machine is in the lower position. It is furthermore the composing stick itself which releases both the reading of the first combination and also the advance of the perforated card, through the intermediary of the rollers 42 and 43.

In addition, the reading device already existing on a typesetting machine is normally provided with an advance device for a perforated tape, since this existing reading device is only designed for the case of perforated tapes and not for perforated cards. Consequently, this tape advance device which is already provided on a conventional typesetting machine can act by means of an electric signal on the feed rollers 42 and 43 of the reading device for the perforated card according to the invention.

It follows therefore that such an electric signal (or order to advance) can be received at 56 in FIG. 8. This signal is transmitted along the line 57 and through the contact 58, which is closed, and then follows line 59 in order to excite the relays 60a and 60b. This excitation results in the closure of the corresponding contacts 61a and 61b. The closure of the contact 61a causes the starting-up of the motor 49 (which, as has been seen above, will act on the rotation of the rollers 42 and 43) supplied from the current source S.

The signal received from 56 has also excited the relay 62, which causes the closure of the contact 62a, and in consequence the self-excitation of the said relay 62 by the current from the source S which follows the line 63, passing through the closed contact 65a. This current at 63 will thus also permit (by following the circuit 63, 65a, 62a, 62 and 59) the maintenance of the excitation of relay 60a and in consequence the maintenance of the supply to the motor 49.

The signal 56 has also excited the relay 64, with a certain delay however with respect to the excitation of relay 62. This delayed excitation of 64 results in the closure of the contact 64a, the excitation of relay 66 and in consequence the opening of the contact 58 and the elimination of the signal received from 56. Before the interruption of the signal from 56, it should also be indicated that when the contact 58 was closed, the relay 67 was excited. The function of the excitation of this relay 67 will be explained later.

The rotation of the motor 49, as previously described, has caused the advance or feed of a card C through the intermediary of the rollers 42 and 43. During the passage of a first combination of perforations over the photosensitive reading device, an electric signal appears in one or more of the lines 68. This signal or signals are amplified by the amplifier 69. At the outlet of this amplifier, the amplified signal or signals follow one or more of the lines 70, according to the combination corresponding to the perforations read. This signal or signals 70 excite the corresponding relays 71, and the excitation of one or more of these relays results in the closure of the corresponding contacts such as 71a, which permits the self-excitation of this relay or relays 71 by the current derived from S, the contact 67a being then in the closed position.

Any output signal proceeding from the amplifier 69 also results in a signal in one or more of the lines 72, always in dependence on the combination read.

The current in any of the lines 72 supplies the line 73 which excites the relay 74 and the relay 75, the function of which will be described later. The excitation of relay 74 results in the closure of the contact 74a, the contact 61b being closed as already explained above, which permits the self-excitation from S of the said relays 60a and 60b.

The excitation of the relay 75 closes the contact 75a, which excites the relay 65 which opens the contact 65a and consequently cancels the self-excitation of the relay 62 which has been referred to above.

As has also been previously seen, the signals emitted by the reading device are transmitted by the lines 46 to the device 7 which re-transmits at the level of the already existing feelers of the typesetting machine the equivalent of the combination read. As the motor 49 continues to rotate and the card C continues to move forward, there arrives a moment at which the combinations of perforations are no longer presented in front of the photoelectric cells. There is therefore no signal at 68 and in consequence the relays 74 and 75 are no longer excited, which results, especially as regards the relay 74, in the opening of the contact 74a and in consequence the relays 60a and 60b can no longer be self-excited by the source S and the motor 49 stops as a result of the opening of the contact 61a and the closure of the contact 61c. The current source S then acts on the braking device 76 of the said motor.

The perforated card is then in the position shown in FIG. 9, in which there has been shown the photoelectric cell reading device 46, located in a position intermediate between two combinations of perforations in the card C.

The second tape advance order signal is then awaited. The second tape advance order will be transmitted, as explained above, from 56, and the operation is effected as before. The function of the relay 67, which, as already stated, is excited in a very brief manner upon the initiation of a signal at 56, should now be explained.

The excitation of this relay 67 results in the opening of the contact 67a and in consequence the cancellation of the combination previously memorized in the said corresponding relays 71.

The new tape-advance order has caused the advance of the card C, as described above, up to the moment of the appearance of a new combination of perforations, and the cycle is then repeated as described previously. It can be seen that it is thus possible in accordance with the invention to synchronize readily the advance of a perforated card at the level of the reading device with the operation of a typesetting machine already equipped with a reading device which is not suitable for reading perforated cards. It has been seen however that the actual movements of the already existing reading device on a typesetting machine are used to control the advance of a perforated card over an auxiliary reading device.

It will furthermore be understood that the present invention has only been described purely by way of explanation and not in any limitative sense, and that all useful modifications may be made thereto without departing from its scope. It should also be indicated that, obviously, if the code of perforations of the cards C does not correspond to the code for which the feelers of the already existing reading device on a typesetting machine have been provided, it is a simple matter to provide on the upstream side of the device 7, a so-called "transcoder" or "decoder" circuit as known to those skilled in the art.

We claim:

1. A typesetting machine operated by information fed to the machine from perforated cards comprising a typesetting machine having a keyboard; means for operating said keyboard from perforated cards including a feeding means for said perforated cards, means for reading the codified perforations, means for causing said cards to pass in front of said reading means, receiving means for said cards after reading, and means for bringing said cards to said receiving means, an electric circuit associated with said reading means, and an electromechanical device associated with said electric circuit adapted to reproduce mechanically the codified signs and to act on the keys of said keyboard.

2. Apparatus as claimed in claim 1, in which said means for feeding perforated cards comprises a card magazine, an oscillating arm provided with gripping means, and means for conveying each card towards said means for reading said perforations.

3. Apparatus as claimed in claim 2, in which said reading means comprises photosensitive cells adapted to transform the light signals into electric signals and to transmit said electric signals to said electromechanical device mounted on said typesetting machine, said electromechanical device cooperating so as to act on the keys of said keyboard.

4. Apparatus as claimed in claim 2, in which said gripping means is constituted by a lift-and-force pump adapted to act on suction devices mounted on said oscillating arm.

5. Apparatus as claimed in claim 2, in which said conveying means for each card over said reading means comprises at least one series of rollers mechanically mounted and adapted to displace said cards.

References Cited by the Examiner

UNITED STATES PATENTS

| | | | |
|---|---|---|---|
| 677,062 | 6/1901 | Combs | 271—11 |
| 819,352 | 5/1906 | Kleim | 271—11 |
| 1,578,822 | 3/1926 | Glover | 271—11 |
| 2,456,771 | 12/1948 | DeSimone | 235—61.6 |
| 2,589,676 | 3/1952 | Crissy | 271—11 |
| 2,999,686 | 9/1961 | Cheesman | 271—11 |

MAYNARD R. WILBUR, *Primary Examiner.*

DARYL W. COOK, *Examiner.*

RONALD E. COUNCIL, *Assistant Examiner.*